March 24, 1931.                L. BLACKMORE                1,797,710
                          FENDER WELL TIRE CARRIER
                            Filed Aug. 13, 1928
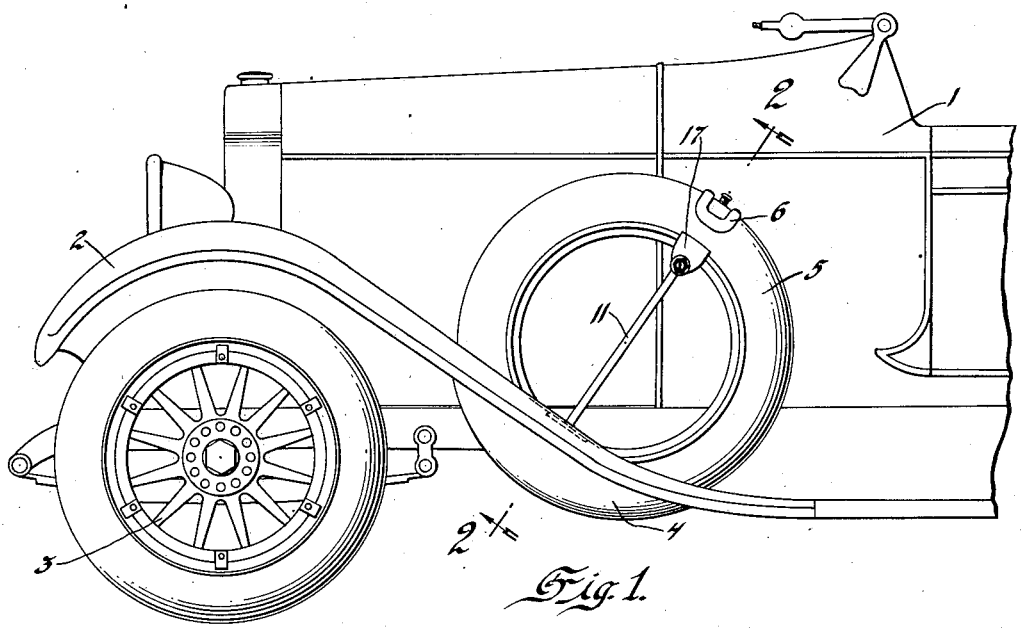
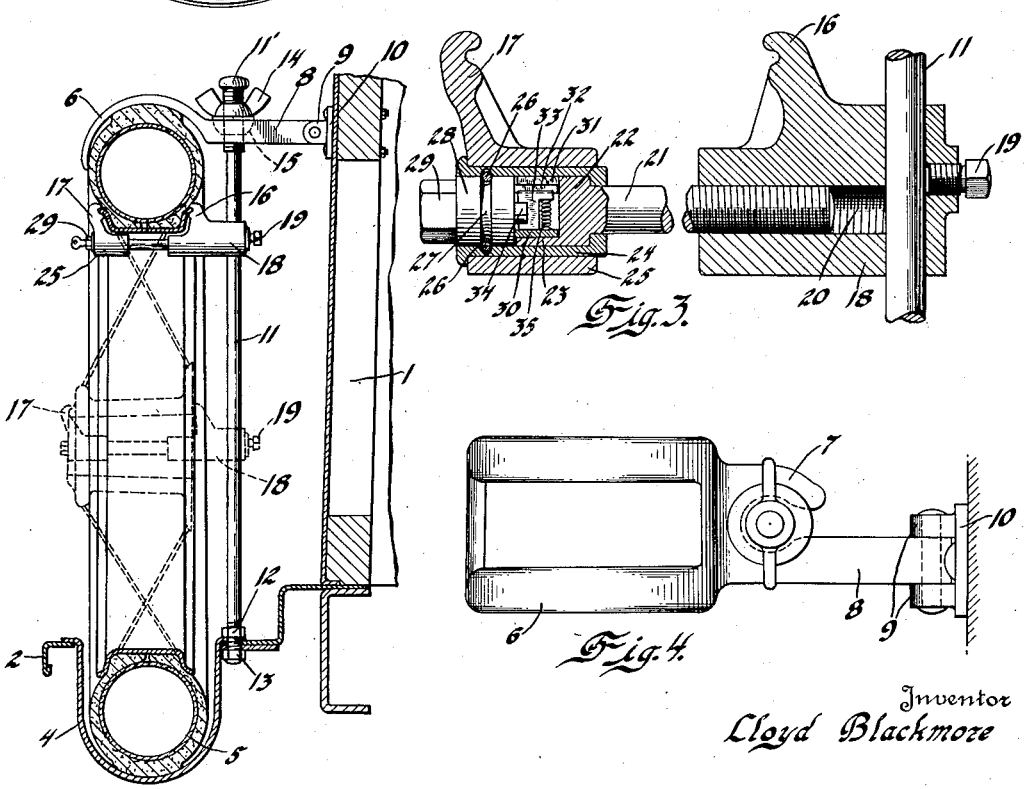
Inventor
Lloyd Blackmore Patented Mar. 24, 1931

1,797,710

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

FENDER-WELL TIRE CARRIER

Application filed August 13, 1928. Serial No. 299,294.

This invention relates to motor vehicles and more particularly to spare tire carriers of the fender well type.

The invention contemplates the provision of an arcuate pocket or well in the fender or mud guard over the front wheel just forward of the door to the driver's seat for the reception of an extra or spare tire and a lever arm pivoted to the side of the vehicle body to engage with the tread of the tire at a point substantially diametrically opposite the fender well. A tie rod extends upwardly from the fender and projects through the tire engaging lever arm and an adjustable nut on the end thereof serves to move and hold the arm in contact with the tire to firmly clamp the spare tire in the well and prevent the jumping or bouncing of the tire due to vibration or the jarring of the vehicle during travel, and so reduce damage and chafing of the tread surface.

The invention further contemplates the provision of a pair of clamping jaws held against unauthorized manipulation by lock mechanism, the jaws being adjustably mounted on the tie rod so as to be movable to different positions thereon for engagement with either a spare tire rim or the hub of a spare wheel, dependent on the automotive equipment employed, for preventing theft or surreptitious removal of the spare tire.

A more complete understanding of the invention will be had from the accompanying specification when taken in connection with the accompanying drawing illustrating a preferred embodiment thereof, and wherein Fig. 1 is a side elevation of a portion of an automobile showing the application of the invention; Fig. 2 is a section on line 2—2 of Fig. 1; Fig. 3 is a detail sectional view of the clamping jaws; and Fig. 4 is a top plan view of the tire engaging lever arm.

Referring to the drawing the character 1 indicates a vehicle body and 2 is the fender or mud guard over the front wheel 3, having a pocket or well 4 for receiving a spare or extra tire 5. Engaging with the periphery or tread of the tire at a point substantially opposite the well 4 is a lever arm comprising an arcuate tire engaging portion 6 and a bifurcated portion having a short leg 7 and a long leg 8, the leg 8 being pivoted or hinged between the ears 9 of a bracket 10 that is mounted on the side of the vehicle body 1. Projecting through the space between the legs 7 and 8 is a tie rod 11 extending upwardly from the fender and anchored thereto by fastening nuts 12 and 13. The lower end of the tie rod may be peened over after assembly to preclude removal of the nut 13. A hand nut 14 screw-threaded on the upper end of the tie rod beneath an integral enlargement 11′ has a semi-spherical portion 15 seating in a ball socket provided in the adjacent sides of the forks or legs 7 and 8 and is capable of exerting considerable pressure to swing the tire engaging lever arm and effect the tight clamping of the tire in the well.

Mounted on the rod 11 is a pair of relatively movable or separable clamping jaws 16 and 17, the jaw 16 being formed on a block 18 having an opening through which the rod 11 projects, the block being held in place on the rod by set screw 19, and a screw-threaded opening 20 in which is adjustably engageable the stud or bolt 21. The head 22 of the bolt 21 is provided with a hollow extension forming a skirt 23, contained within a sleeve 24 extending through the cylindrical portion 25 of the movable jaw 17. Also contained within the sleeve 24 for relative rotation by means of locating pins 26 partially projecting into the annular groove 27 is a lock barrel 28, housing suitable lock mechanism and having at one end beyond the sleeve 24, a hexagonal or otherwise shaped portion 29, for the engagement of an operating tool, and at the other end an extension or skirt 30 projecting within the skirt 23. The skirts 23 and 30 are provided with slots or ways 31 and 32 respectively which when in alignment with each other permit the sliding therethrough of a key or plunger 33 controlled by the proper manipulation of the lock mechanism that actuates the cam element 34 either to retract the key or permit its insertion through the aligned grooves under the influence of a spring 35.

When the key 33 is held in its retracted position, any rotation of the barrel by the application of a tool to the portion 29 will have no effect on the adjusted position of the two clamping jaws. However, should the proper key be inserted in the lock mechanism, then the cam 34 will be actuated to allow the spring 35 to push the plunger 33 into the slots 31 and 32, thereby interlocking the barrel 28 and the stud 21, and thereafter rotation of the barrel also rotates the stud to effect its threading or unthreading in the opening 20 of the block 18.

The motor car manufacturer of today usually equips his vehicles with several different types of wheels. In some cases the changing of tires necessitates the removal of a tire rim, while in other instances the entire wheel must be taken off, whether it be wood spoke, wire spoke, or disc wheel. The present tire carrier has been designed to meet all these conditions so as to save production cost, and allow the use of the same carrier regardless of the type of wheel that may be placed on the vehicle. Where the rim is demountable from the wheel the clamping jaws are mounted on the upper portion of the rod 11 and engage opposite sides of the spare rim as shown in full lines in Fig. 2, and in those instances where a demountable wheel is employed the jaws are moved down on the rod so as to clamp the sides of the wheel hub as is illustrated by the dotted lines in Fig. 2. Thus the only change necessary to accommodate either a rim or wheel is merely a change in the position of the clamp jaws which obviously is readily made by simply adjusting the set screw 19 and sliding the block 18 up or down on the rod 11.

When it is desired to remove the spare tire the proper actuation of the lock mechanism is first necessary to couple the stud 21 and barrel 28, whereupon the application of a tool to the portion 29 unthreads the stud 21 from the block 18 to separate the clamping jaws 16 and 17. The threading back of the wing nut 14 against the head or enlargement 11' permits the rod to be sprung inwardly toward the car and out of the slot or space between the furcations or legs 7 and 8 and the upward swinging of the tire engaging lever arm. After replacement of a tire in the fender well, the reverse procedure securely holds the spare tire in place and precludes unauthorized removal thereof.

While only one embodiment of the invention has been specifically described and illustrated, it is to be understood that the invention is not limited to the exact details shown but that such modification may be made as come within the scope of appended claims.

I claim:

1. In a motor vehicle, the combination with a fender having a tire well therein, of a pivoted lever arm for engagement with a tire to hold the tire in the well, a tie rod adjustably connecting the lever arm with the fender, a pair of tire-engaging clamp jaws slidable on the rod, and lock mechanism to hold the jaws against unauthorized separation to prevent removal of the tire from the well.

2. In a motor vehicle, the combination with a fender having a tire well therein, of a pivoted tire engaging arm movable relative to the well to removably clamp a tire therein, a tie rod extending upwardly from the fender and having an adjustable element engageable with the arm to removably hold the arm in engagement with the tire, a tire-engaging member carried by said rod and extending laterally therefrom, a second tire-engaging member adjustably connected with the first member to clamp a tire therebetween and lock mechanism to prevent unauthorized movement of said members and their disengagement from the tire.

3. In a motor vehicle, the combination with a tire receiving well, of a rod extending upwardly from the well, a tire engaging member associated with the rod to removably hold a tire in the well, a second tire engaging member fixedly carried by and extending laterally from the rod, a clamping element detachably secured to said second tire engaging member and means to lock said clamping element against detachment.

4. In a motor vehicle, the combination with a tire well, of a rod extending upwardly from the well, a tire-engaging member movable up and down on the rod to engage with either a spare rim or the hub of a spare wheel, a clamp member adjustably carried by and cooperating with the first member, and lock mechanism associated with said members to prevent the separation thereof and unauthorized removal of a tire from the well.

5. In a motor vehicle, the combination with a tire well, of means to prevent unauthorized removal of a tire from the well including a pair of relatively adjustable clamping jaws, lock means to prevent adjustment of the jaws, and a mounting rod extending upwardly from the well on which one of said jaws is mounted for sliding movement to a fixed position to clamp either a spare tire rim or the hub of a spare wheel.

6. A spare tire carrier including a tire-receiving pocket, a pivoted tire-engaging arm to removably hold a tire in the pocket, a tie rod having one end fixed relative to the pocket and its other end movable laterally into and out of an open ended slot in the tire-engaging arm, and an adjustable element on the free end of the rod for engagement with an arm to hold it in tight engagement with the tire and prevent removal of the rod from said slot.

7. A spare tire carrier including a tire-receiving pocket, a pivoted tire-engaging arm to removably hold a tire in the pocket, a tie rod having one end fixed relative to the pocket and its other end movable laterally into and out of an open ended slot in the tire-engaging arm, an adjustable element to hold the rod in the slot, a pair of clamp jaws slidable on the rod to engage either a tire rim or a wheel hub, and a lock for said clamp jaws.

8. In a motor vehicle, the combination with a tire receiving well, of a rod extending upwardly from the well, a tire clamping member adjustably associated with the rod to removably hold a tire in the well, a tire engaging member carried by and extending laterally from the rod, and a lock for preventing unauthorized disengagement of said tire engaging member.

9. In a motor vehicle, the combination with a tire receiving well, of a rod extending upwardly from the well, a tire clamping member adjustably associated with the rod to removably hold a tire in the well, and antitheft means carried by and extending laterally from the rod for engagement with the tire to prevent unauthorized removal thereof.

10. A spare tire carrier, including a tire receiving pocket, a pivoted tire engaging arm to removably hold the tire in the pocket, an inextensible tie rod anchored at one end and normally extending at its free end through an open ended slot in the arm but adapted to be sprung out of the slot to clear the arm, a member adjustable on the rod for engagement with the arm to hold said arm engaged with the tire.

11. A spare tire carrier including a tire receiving pocket, a pivoted tire engaging arm to removably hold the tire in the pocket, a tie rod having one end anchored and its other end removable radially into and out of an open ended slot in the arm, a fastening member adjustable on the free end of the rod for engagement with the arm, and means on the rod beyond the fastening member to preclude removal of said member from the rod.

12. A spare tire carrier including a tire receiving pocket, a pivoted tire engaging arm to removably hold the tire in the pocket, a tie member having one end anchored and its other end movable radially into and out of an open ended slot in the tire engaging arm, and adjustable means to hold the tie member in said slot with the arm engaging the tire.

In testimony whereof I affix my signature.

LLOYD BLACKMORE.